(12) United States Patent
Kikuchi (10) Patent No.: US 9,781,810 B2
(45) Date of Patent: Oct. 3, 2017

(54) CONTROL APPARATUS, CONTROL SYSTEM, AND APPLIANCE CONTROL DEVICE

(71) Applicant: AZBIL CORPORATION, Chiyoda-ku (JP)

(72) Inventor: Makoto Kikuchi, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/152,766

(22) Filed: May 12, 2016

(65) Prior Publication Data

US 2016/0338176 A1 Nov. 17, 2016

(30) Foreign Application Priority Data

May 15, 2015 (JP) .................................. 2015-100414

(51) Int. Cl.
| | | |
|---|---|---|
| *H05B 37/02* | (2006.01) | |
| *F24F 11/00* | (2006.01) | |
| *F24F 5/00* | (2006.01) | |

(52) U.S. Cl.
CPC ....... *H05B 37/0227* (2013.01); *F24F 5/0042* (2013.01); *F24F 11/0034* (2013.01)

(58) Field of Classification Search
CPC ...... F24F 11/0034; F24F 1/007; F24F 11/053; F24F 11/001; F24F 5/0042; H05B 37/0227; H05B 37/0245; G08B 25/008; G08B 25/14; G08B 29/16
USPC .......... 700/276–278, 299, 300; 315/307, 308
See application file for complete search history.

(56) References Cited

U.S. PATENT DOCUMENTS

| | | | | |
|---|---|---|---|---|
| 5,706,191 A * | 1/1998 | Bassett | .................. | G01D 4/004 700/274 |
| 7,351,974 B2 * | 4/2008 | Setlak | .................. | G06K 9/0004 250/341.1 |
| 7,643,908 B2 * | 1/2010 | Quirino | ................ | F24F 11/0034 165/237 |
| 8,704,076 B2 * | 4/2014 | Braun | .................. | F24F 5/0042 136/204 |
| 8,809,789 B2 * | 8/2014 | Matsumoto | ........... | F24F 1/0007 250/353 |
| 9,028,137 B2 * | 5/2015 | Sjolund | ................ | B60N 2/5678 136/200 |
| 9,460,610 B2 * | 10/2016 | Okeefe | ................ | G08B 25/008 |

FOREIGN PATENT DOCUMENTS

| | | |
|---|---|---|
| JP | 2005-271321 A | 10/2005 |
| JP | 2013-093103 | 5/2013 |
| KR | 10-2010-0132221 A | 12/2010 |
| KR | 10-2012-0022539 A | 3/2012 |

OTHER PUBLICATIONS

Office Action dated Apr. 17, 2017 in Korean Patent Application No. 10-2016-0051566.

* cited by examiner

*Primary Examiner* — Haissa Philogene
(74) *Attorney, Agent, or Firm* — Oblon, McClelland, Maier & Neustadt, L.L.P.

(57) ABSTRACT

A control apparatus includes a sensor and a control circuit. The sensor obtains a thermal pattern formed by a plurality of thermo-elements arranged in an appliance control device, a temperature of heat generated by each of the plurality of thermo-elements being controllable. The control circuit controls an appliance in accordance with the thermal pattern obtained by the sensor.

16 Claims, 10 Drawing Sheets

| THERMAL PATTERN | CONTROL MODE OF LIGHTING APPLIANCE |
|---|---|
| PT1 | ON |
| PT2 | OFF |
| PT3 | ILLUMINANCE LEVEL A |
| PT4 | ILLUMINANCE LEVEL B |

| THERMAL PATTERN | CONTROL MODE OF AIR-CONDITIONING APPLIANCE |
|---|---|
| PT1 | ON |
| PT2 | OFF |
| PT3 | SET TEMPERATURE P°C |
| PT4 | SET TEMPERATURE Q°C |

CONTROL APPARATUS, CONTROL SYSTEM, AND APPLIANCE CONTROL DEVICE

CROSS-REFERENCE TO RELATED APPLICATIONS

This application claims priority to Japanese Application No. 2015-100414, filed May 15, 2015, the entire contents of which are incorporated herein by reference.

BACKGROUND

1. Field

The present disclosure relates to a control apparatus, a control system, and an appliance control device, and particularly relates to a control apparatus, a control system, and an appliance control device that control a certain appliance installed in a facility.

2. Description of the Related Art

There is a lighting apparatus that detects the presence or absence of a person by using an infrared detection element called a pyroelectric infrared sensor and that performs on/off control of lighting on the basis of the detection result (see, for example, Japanese Unexamined Patent Application Publication No. 2013-093103).

The lighting apparatus according to Japanese Unexamined Patent Application Publication No. 2013-093103 utilizes a characteristic that an illuminance change and heat transfer simultaneously occur only if a person in a room space moves. The lighting apparatus includes an illuminance detector that outputs a high voltage when ambient illuminance is higher than a reference and that outputs a low voltage when ambient illuminance is lower than the reference, and a pyroelectric infrared sensor serving as a human detector that outputs a high output value when a person is not detected and that outputs a low output value when a person is detected. This lighting apparatus performs AND processing on outputs from the illuminance detector and the human detector, and is thereby able to detect the presence or absence of a person in a room space and to perform on/off control of lighting.

The lighting apparatus according to Japanese Unexamined Patent Application Publication No. 2013-093103 detects a person on the basis of detection results obtained by the illuminance detector and the human detector. However, if a user passes in front of the lighting apparatus and if the lighting apparatus determines that the human detector has detected a person, the lighting apparatus remains in an on-state thereafter even if the user is not present any more.

That is, the lighting apparatus according to Japanese Unexamined Patent Application Publication No. 2013-093103 performs on/off control of lighting regardless of an intention of a user, and thus may cause a situation that is not necessarily favorable to the user.

SUMMARY

According to one embodiment, there is provided a control apparatus, comprising: (1) a processor configured to obtain a thermal pattern formed by a plurality of thermo-elements arranged in an appliance control device, a temperature of heat generated by each of the plurality of thermo-elements in the appliance control device being controllable; and (2) a control circuit configured to control an appliance in accordance with the thermal pattern obtained by the sensor.

In one embodiment, the plurality of thermo-elements are Peltier elements.

In another embodiment, the sensor is a thermopile configured to obtain the thermal pattern formed by the plurality of thermo-elements as a thermal image.

In still another embodiment, the appliance is a lighting appliance, and the control circuit is configured to control on, off, and dimming of the lighting appliance.

In another embodiment, the appliance is an air-conditioning appliance, and the control circuit is configured to control on, off, and a set temperature of the air-conditioning appliance.

In yet another embodiment, the control circuit is configured to control the appliance in accordance with a control table stored in a memory, the control table storing thermal patterns in association with corresponding control modes of the appliance.

In another embodiment, there is provided a control system, comprising: (1) an appliance control device including a plurality of thermo-elements arranged therein, a temperature of heat generated by each of the plurality of thermo-elements being controllable; (2) a sensor configured to obtain a thermal pattern formed by the plurality of thermo-elements; and (3) a control circuit configured to control an appliance in accordance with the thermal pattern obtained by the sensor.

In another embodiment, there is provided an appliance control device, comprising: (1) a plurality of thermo-elements that form a plurality of thermal patterns; and (2) a thermo-element control circuit configured to set the plurality of thermal patterns by controlling a temperature of heat generated by each of the plurality of thermo-elements.

DESCRIPTION OF THE PREFERRED EMBODIMENTS

The present disclosure is directed to addressing such an issue and provides a control apparatus, a control system, an appliance control device, and a control method that are capable of reflecting an intension of a user in control of an appliance.

A control apparatus according to an embodiment of the present disclosure includes an obtaining unit (SP1, SP2) and a controller (10, 30). The obtaining unit (SP1, SP2) obtains a thermal pattern (PT1 to PT4) formed by a plurality of thermo-elements (HC11 to HC37) arranged in an appliance control device (2), a temperature of heat generated by each of the plurality of thermo-elements (HC11 to HC37) being controllable. The controller (10, 30) controls an appliance (LT1, LT2, AC1, AC2) in accordance with the thermal pattern (PT1 to PT4) obtained by the obtaining unit (SP1, SP2).

The plurality of thermo-elements (HC11 to HC37) are Peltier elements.

The obtaining unit (SP1, SP2) is a thermopile and obtains the thermal pattern (PT1 to PT4) formed by the plurality of thermo-elements (HC11 to HC37) as a thermal image (H1 to H4).

The appliance (LT1, LT2, AC1, AC2) is a lighting appliance (LT1, LT2), and the controller (10) controls on, off, or dimming of the lighting appliance (LT1, LT2).

The appliance (LT1, LT2, AC1, AC2) is an air-conditioning appliance (AC1, AC2), and the controller (30) controls on, off, or a set temperature of the air-conditioning appliance (AC1, AC2).

A control system (1, 20) according to an embodiment of the present disclosure includes an appliance control device (2), an obtaining unit (SP1, SP2), and a controller (10, 30). The appliance control device (2) includes a plurality of thermo-elements (HC11 to HC37) arranged therein, a temperature of heat generated by each of the plurality of thermo-elements (HC11 to HC37) being controllable. The obtaining unit (SP1, SP2) obtains a thermal pattern (PT1 to PT4) formed by the plurality of thermo-elements (HC11 to HC37). The controller (10, 30) controls an appliance (LT1, LT2, AC1, AC2) in accordance with the thermal pattern (PT1 to PT4) obtained by the obtaining unit (SP1, SP2).

An appliance control device (2) according to an embodiment of the present disclosure includes a plurality of thermo-elements (HC11 to HC37) and a thermo-element controller (25). The plurality of thermo-elements (HC11 to HC37) form a plurality of thermal patterns (PT1 to PT4). The thermo-element controller (25) sets the plurality of thermal patterns (PT1 to PT4) by controlling a temperature of heat generated by each of the plurality of thermo-elements (HC11 to HC37).

According to an embodiment of the present disclosure, the obtaining unit (SP1, SP2) obtains the thermal pattern (PT1 to PT4) set by the plurality of thermo-elements (HC11 to HC37) of the appliance control device (2) and the appliance (LT1, LT2, AC1, AC2) is controlled in accordance with the thermal pattern (PT1 to PT4). Accordingly, an intention of a user (UA) may be reflected in control of the appliance (LT1, LT2, AC1, AC2) via the thermal pattern (PT1 to PT4) of the appliance control device (2).

According to an embodiment of the present disclosure, the plurality of thermo-elements (HC11 to HC37) are Peltier elements, and thus temperatures of heat generated by the plurality of thermo-elements (HC11 to HC37) may be easily controlled and a plurality of thermal patterns (PT1 to PT4) may be set.

According to an embodiment of the present disclosure, the obtaining unit (SP1, SP2) is a thermopile, and the thermal pattern (PT1 to PT4) formed by the plurality of thermo-elements (HC11 to HC37) is obtained as the thermal image (H1 to H4), and thus an intention of the user (UA) may be reliably reflected in control of the appliance (LT1, LT2, AC1, AC2) via the thermal image (H1 to H4).

Hereinafter, first and second embodiments of the present disclosure will be described with reference to the attached drawings.

First Embodiment

Overall Configuration of Control System

Figure 1:
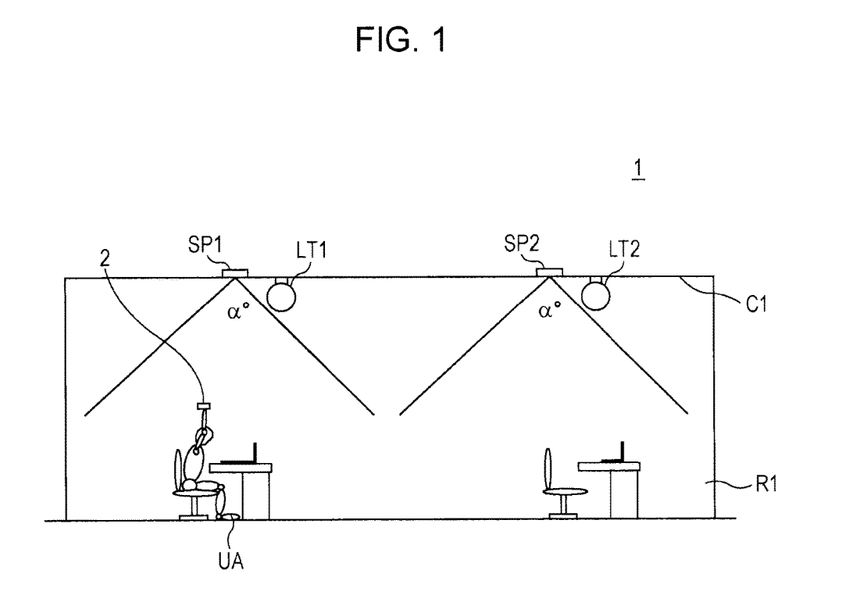
FIG. 1 is a schematic diagram illustrating the overall configuration of a lighting control system according to a first embodiment.
Figure 2:
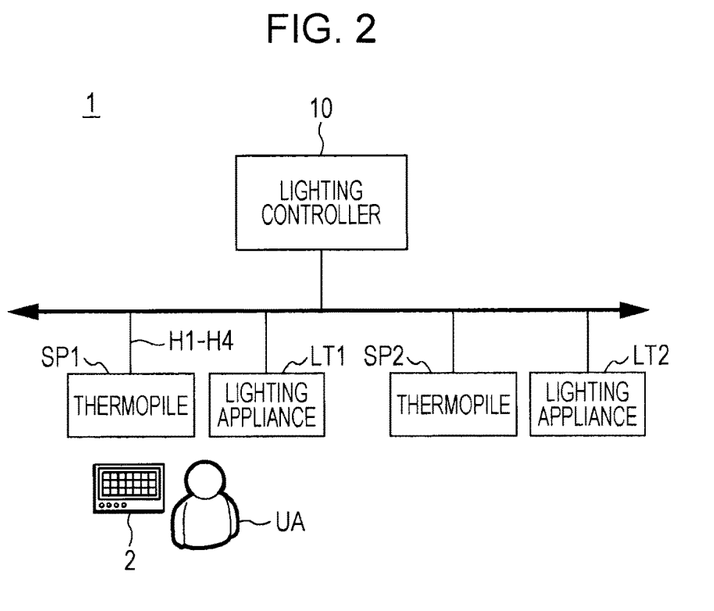
FIG. 2 is a block diagram illustrating the configuration of the lighting control system.

As illustrated in FIGS. 1 and 2, a control system 1 according to the first embodiment includes thermopiles SP1 and SP2 installed on a ceiling C1 of a room R1, lighting appliances LT1 and LT2 installed near the thermopiles SP1 and SP2, an appliance control device 2 used by a user UA to control the lighting appliances LT1 and LT2, and a lighting controller 10 for controlling the lighting appliances LT1 and LT2.

The thermopiles SP1 and SP2 have the same structure, and also the lighting appliances LT1 and LT2 have the same structure. Here, a description will be given of the appliance control device 2, the thermopile SP1, and the lighting appliance LT1.

Appliance Control Device

Figure 3:
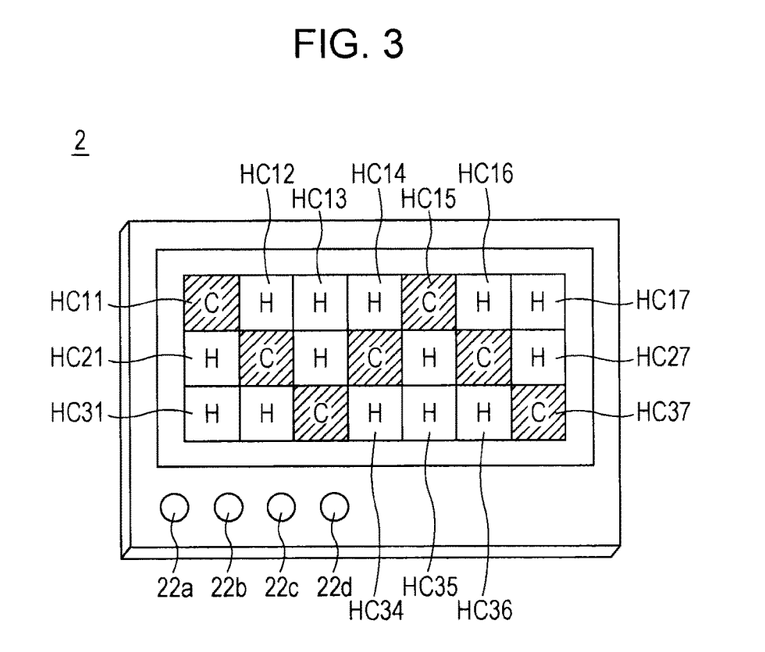
FIG. 3 is a perspective view illustrating a first external configuration of an appliance control device.
Figure 4:
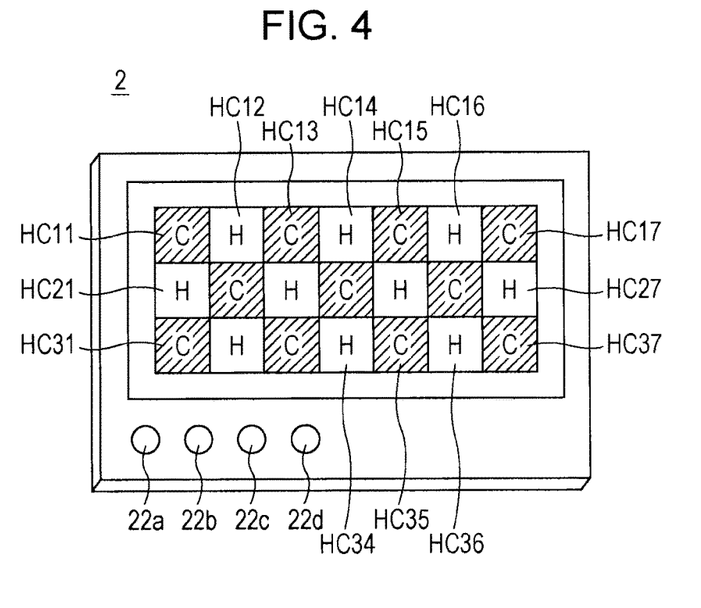
FIG. 4 is a perspective view illustrating a second external configuration of the appliance control device.

Referring to FIGS. 3 and 4, the appliance control device 2 is a control device that is used to reflect an intention of the user UA when controlling the lighting appliances LT1 and LT2, and includes a central processing unit (CPU), a memory, a battery, and so forth.

The appliance control device 2 is formed of a card-type storage medium for information processing that is potable by the user UA, such as a memory card or IC card, and includes a plurality of thermo-elements HC11 to HC37, which are Peltier elements, arranged in a 3×7 matrix in an exposed state. All the thermo-elements HC11 to HC37 are Peltier elements with the same configuration. The appliance control device 2 also includes operation input buttons 22a to 22d, which are arranged below the thermo-elements HC11 to HC37.

A Peltier element is a plate-shaped electronic component that includes p-type and n-type semiconductors joined to a copper plate functioning as a heat absorption surface or heat dissipation surface and that utilizes a Peltier effect in which a flow of DC current from the n-type semiconductor toward the p-type semiconductor causes heat to be transferred from the heat absorption surface to the heat dissipation surface. The absorption and dissipation of heat in the Peltier element is controllable by changing the magnitude of current to be flown through the Peltier element.

The thermo-elements HC11 to HC37 provided in the appliance control device 2 may be set so that the temperature on the heat dissipation surface comes into a "hot" state with about 30° C. when a DC current is flown from the n-type semiconductor toward the p-type semiconductor and that the temperature on the heat absorption surface switched from the heat dissipation surface comes into a "cold" state with about 10° C. when a DC current is flown from the p-type semiconductor toward the n-type semiconductor.

Thus, in the appliance control device 2, when the direction of the DC current supplied to each of the thermo-elements HC11 to HC37 is changed, the thermo-elements HC13, HC17, HC31, and HC35 that are in the "hot" state as illustrated in FIG. 3 are switched to the "cold" state as illustrated in FIG. 4.

In this way, the appliance control device 2 changes a combination of the "hot" and "cold" states of the thermo-elements HC11 to HC37 and is thereby able to generate various thermal patterns. The appliance control device 2 generates, for example, four thermal patterns: first to fourth thermal patterns.

Figure 5:
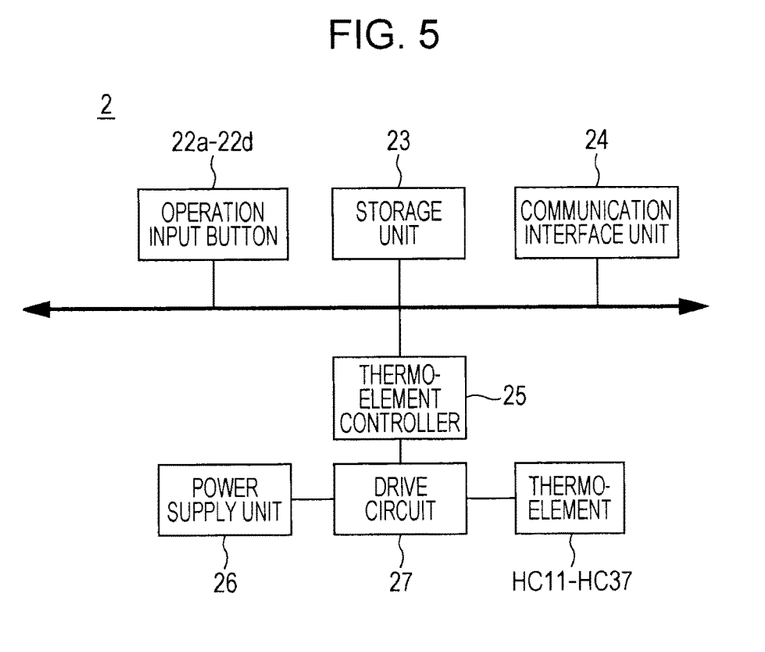
FIG. 5 is a block diagram illustrating the circuit configuration of the appliance control device.

As illustrated in FIG. 5, the appliance control device 2 includes the operation input buttons 22a to 22d, a storage unit 23, a communication interface unit 24, a thermo-element controller 25, a power supply unit 26, a drive circuit 27, and the thermo-elements HC11 to HC37.

The operation input buttons 22a to 22d are provided on a front surface of the appliance control device 2. For example, the operation input buttons 22a to 22d are associated with the first to fourth thermal patterns that are settable by the thermo-elements HC11 to HC37 and are operated to select the first to fourth thermal patterns.

The storage unit 23 is a storage device such as a semiconductor memory or hard disk and stores, in advance, first to fourth thermal pattern information items indicating combinations of the "hot" and "cold" states of the thermo-elements HC11 to HC37 corresponding to the first to fourth thermal patterns.

The communication interface unit 24 is a functional unit that connects the appliance control device 2 to an electronic appliance such as a personal computer. The communication interface unit 24 is used to change, by the personal computer or the like, the first to fourth thermal pattern information items stored in the storage unit 23.

The power supply unit 26 is a source of the DC current to be flown to the thermo-elements HC11 to HC37. The drive circuit 27 changes the direction of the DC current to be flown from the power supply unit 26 to the thermo-elements HC11 to HC37.

The thermo-element controller 25 is a functional unit that controls the drive circuit 27 on the basis of any one of the first to fourth thermal pattern information items so as to switch between the "hot" and "cold" states of the thermo-elements HC11 to HC37. The thermo-element controller 25 is implemented when the CPU reads and executes a program.

Specifically, the thermo-element controller 25 reads any one of the first to fourth thermal pattern information items from the storage unit 23 in accordance with an operation performed on a corresponding one of the operation input buttons 22a to 22d by the user UA, controls the drive circuit 27 on the basis of the read thermal pattern information item, and switches between the "hot" and "cold" states of the thermo-elements HC11 to HC37.

Accordingly, the thermo-element controller 25 is able to set the first thermal pattern PT1 to the fourth thermal pattern PT4 formed by the thermo-elements HC11 to HC37, as illustrated in FIGS. 6 to 9.

Thermopile

The thermopile SP1 is formed of an infrared sensor array in which a plurality of infrared detection sensors are two-dimensionally arranged. The infrared detection sensors generate a thermoelectric power corresponding to the amount of incident energy of infrared emitted by an object. The thermopile SP1 includes, for example, infrared detection sensors (infrared elements) arranged in a 32×31 matrix (corresponding to 992 pixels).

Figure 10:
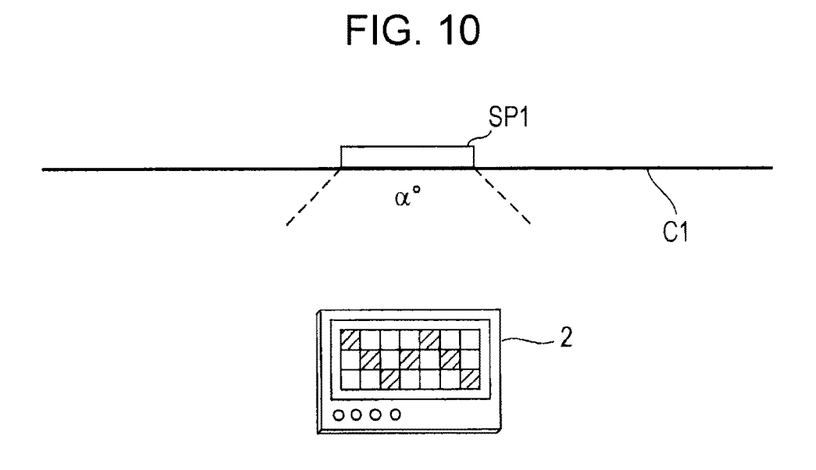
FIG. 10 is a diagram illustrating a state where the appliance control device is placed to face a thermopile.

The thermopile SP1 is a functional unit that is located at a certain distance from the thermopile SP2 on the ceiling C1 of the room R1 and that detects any one of the first thermal pattern PT1 to the fourth thermal pattern PT4 set by the thermo-elements HC11 to HC37 when the appliance control device 2 that is in a range defined by a viewing angle of a degrees specific to the thermopile is placed so as to face the thermopile SP1, as illustrated in FIG. 10.

The thermopile SP1 is able to detect the temperatures of the thermo-elements HC11 to HC37 of the appliance control device 2 in units of several degrees centigrade, and is able to detect the "hot" state with about 30° C. or the "cold" state with about 10° C. of the thermo-elements HC11 to HC37.

Specifically, the thermopile SP1 detects, in a noncontact manner, information items (hereinafter referred to as "thermal images") H1 to H4 representing a spatial temperature distribution corresponding to the first thermal pattern PT1 to the fourth thermal pattern PT4 formed by the thermo-elements HC11 to HC37.

Lighting Appliance

The lighting appliance LT1 is located near the thermopile SP1 on the ceiling C1 and is formed of a fluorescent light, a light emitting diode (LED), or the like that illuminates the space below the thermopile SP1. On, off, and illuminance or the like of the lighting appliance LT1 are controlled by the lighting controller 10.

Lighting Controller

The lighting controller 10 is a functional unit that interprets any one of the first thermal pattern PT1 to the fourth thermal pattern PT4 on the basis of a corresponding one of the thermal images H1 to H4 of the appliance control device 2 obtained by the thermopile SP1 and that controls the lighting appliances LT1 and LT2 in accordance with a control mode corresponding to any one of the first thermal pattern PT1 to the fourth thermal pattern PT4. The lighting controller 10 includes a CPU, a memory, and so forth.

Figure 11:
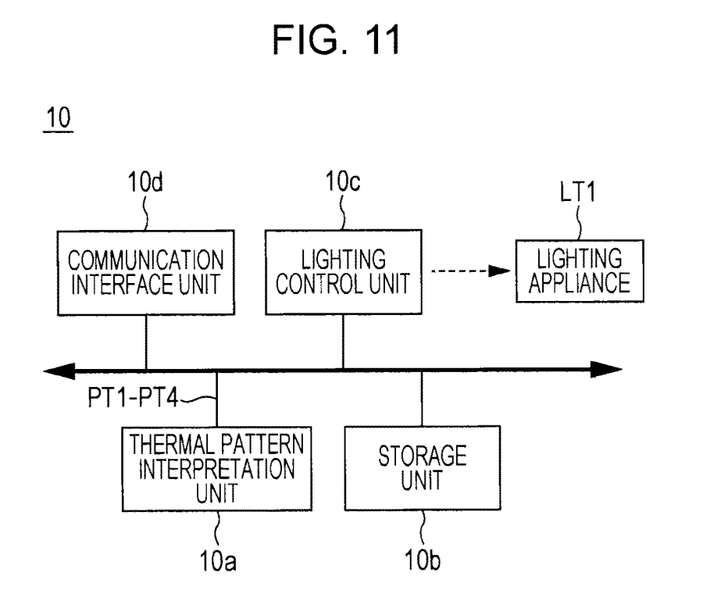
FIG. 11 is a block diagram illustrating the circuit configuration of a lighting controller.

As illustrated in FIG. 11, the lighting controller 10 includes a thermal pattern interpretation unit 10a, a storage unit 10b, a lighting control unit 10c, and a communication interface unit 10d.

The thermal pattern interpretation unit 10a is a functional unit that interprets any one of the first thermal pattern PT1 to the fourth thermal pattern PT4 on the basis of a corresponding one of the thermal images H1 to H4 obtained by the thermopile SP1 and includes an internal memory and an arithmetic processor.

The internal memory of the thermal pattern interpretation unit 10a stores a threshold th1 for determining whether a state is the "hot" state or "cold" state on the basis of the brightness level of a pixel value of the thermal images H1 to H4.

The arithmetic processor of the thermal pattern interpretation unit 10a is a functional unit that determines, if the brightness level of a pixel value of the thermal images H1 to H4 is higher than the threshold th1, that the pixel is in the "hot" state, and, if the brightness level of the pixel value is equal to or lower than the threshold th1, that the pixel is in the "cold" state.

Accordingly, the arithmetic processor of the thermal pattern interpretation unit 10a determines an arrangement of pixels in the "hot" state and pixels in the "cold" state in the thermal image H1, and determines, on the basis of the arrangement of the pixels, which of the first thermal pattern PT1 to the fourth thermal pattern PT4 corresponds to the arrangement.

The storage unit 10b is a storage device such as a semiconductor memory or hard disk and stores a table in which the first thermal pattern PT1 to the fourth thermal pattern PT4 are associated with control modes of the lighting appliance LT1.

Figure 12:
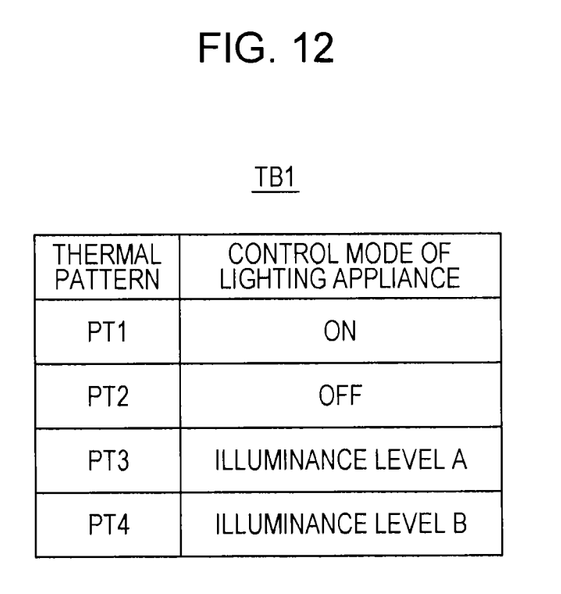
FIG. 12 is a table in which thermal patterns are associated with lighting control modes.

FIG. 12 illustrates an example of a table TB1 in which the first thermal pattern PT1 to the fourth thermal pattern PT4 are associated with control modes of the lighting appliance LT1. In the table TB1, a control mode for setting the lighting appliance LT1 to an on-state corresponding to the first thermal pattern PT1, a control mode for setting the lighting appliance LT1 to an off-state corresponding to the second thermal pattern PT2, a control mode for setting the lighting appliance LT1 to illuminance level A corresponding to the third thermal pattern PT3, and a control mode for setting the lighting appliance LT1 to illuminance level B (A<B) corresponding to the fourth thermal pattern PT4 are registered in advance.

The lighting control unit 10c is a functional unit that outputs a control signal for controlling the lighting appliance LT1 in accordance with the control mode of the lighting appliance LT1 associated with any one of the first thermal pattern PT1 to the fourth thermal pattern PT4 received from the thermal pattern interpretation unit 10a. The thermal pattern interpretation unit 10a and the lighting control unit 10c are implemented when the CPU reads and executes programs.

The communication interface unit 10d is a functional unit that connects the lighting controller 10 and the thermopile SP1 when they communicate with each other, and obtains the thermal images H1 to H4 from the thermopile SP1.

In the first embodiment, the thermopile SP1 and the lighting controller 10 in the control system 1 constitute a control apparatus that controls the lighting appliance LT1, and the thermopile SP2 and the lighting controller 10 in the control system 1 constitute a control apparatus that controls the lighting appliance LT2.

Operation of Control System

The user UA enters the room R1 from the outside and operates the operation input button 22a of the appliance control device 2 while seated at a desk below the thermopile SP1.

Figure 6:
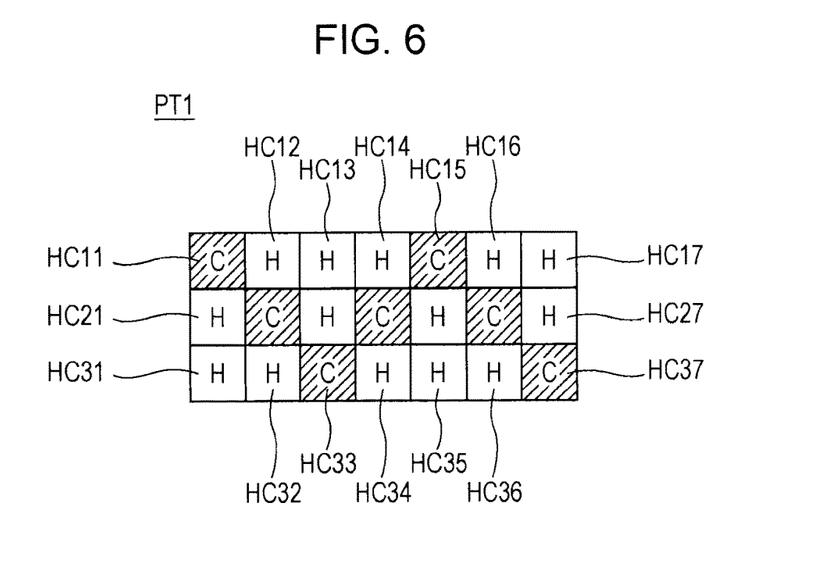
FIG. 6 is a diagram illustrating a first thermal pattern set by a plurality of thermo-elements.

In response to this, the thermo-element controller 25 determines that the operation performed on the operation input button 22a is an instruction to form the first thermal pattern PT1, switches between the "hot" and "cold" states of the thermo-elements HC11 to HC37 on the basis of the first thermal pattern information item stored in the storage unit 23, and forms the first thermal pattern PT1 illustrated in FIG. 6.

The user UA causes the appliance control device 2 to face the thermopile SP1 so that the thermo-elements HC11 to HC37 of the appliance control device 2 face the thermopile SP1 and that the thermopile SP1 is able to detect the first thermal pattern PT1 formed by the thermo-elements HC11 to HC37 of the appliance control device 2.

The thermopile SP1 obtains the thermal image H1 corresponding to the first thermal pattern PT1 formed by the thermo-elements HC11 to HC37 of the appliance control device 2 and transmits the thermal image H1 to the lighting controller 10.

The thermal pattern interpretation unit 10a of the lighting controller 10 interprets the first thermal pattern PT1 on the basis of the brightness levels of pixel values of the thermal image H1, determines the control mode of the lighting appliance LT1 associated with the first thermal pattern PT1 by using the table TB1, and outputs a control signal corresponding to the control mode to the lighting appliance LT1. Accordingly, the lighting appliance LT1 is switched from an off-state to an on-state and is turned on in response to the control signal from the lighting controller 10.

After that, when the user UA operates the operation input button 22b of the appliance control device 2, the thermo-element controller 25 determines that the operation on the operation input button 22b is an instruction to form the second thermal pattern PT2.

Figure 7:
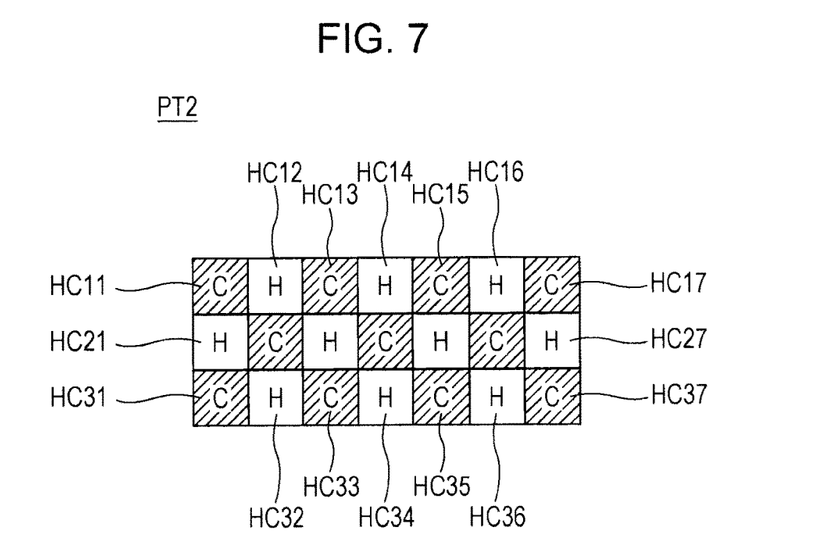
FIG. 7 is a diagram illustrating a second thermal pattern set by the plurality of thermo-elements.

Accordingly, the thermo-element controller 25 switches between the "hot" and "cold" states of the thermo-elements HC11 to HC37 on the basis of the second thermal pattern information item stored in the storage unit 23 and thereby forms the second thermal pattern PT2 as illustrated in FIG. 7.

The thermopile SP1 obtains the thermal image H2 corresponding to the second thermal pattern PT2 and transmits the thermal image H2 to the lighting controller 10. The lighting controller 10 interprets the second thermal pattern PT2 on the basis of the thermal image H2 and outputs a control signal corresponding to the control mode of the lighting appliance LT1 associated with the second thermal pattern PT2 by using the table TB1. Accordingly, the lighting appliance LT1 is switched from the on-state to the off-state and is turned off in response to the control signal from the lighting controller 10.

Figure 8:
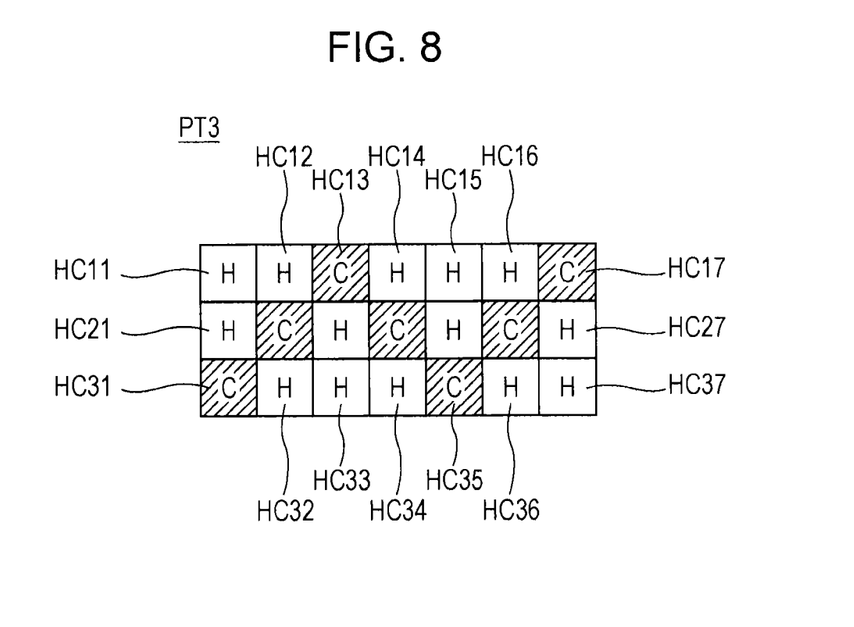
FIG. 8 is a diagram illustrating a third thermal pattern set by the plurality of thermo-elements.
Figure 9:
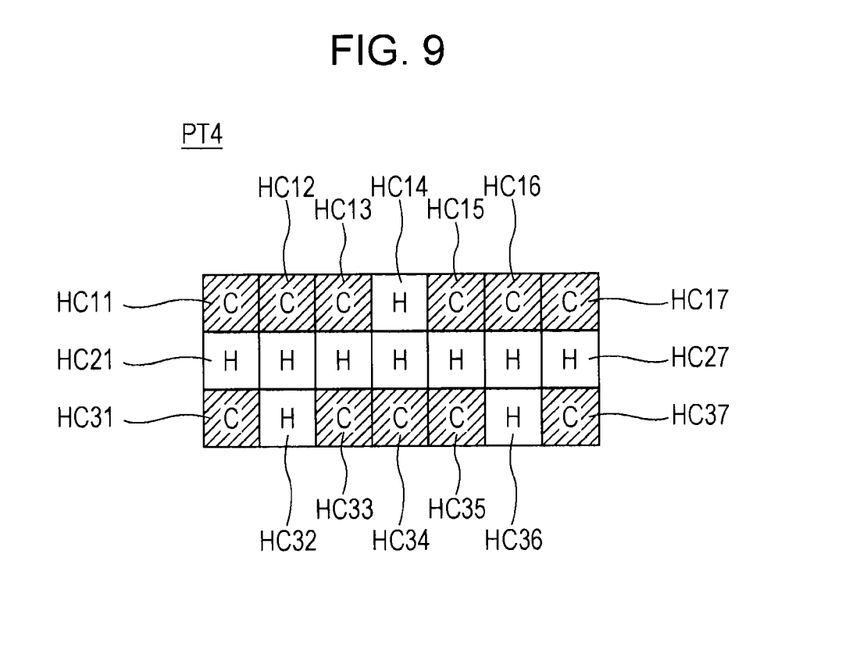
FIG. 9 is a diagram illustrating a fourth thermal pattern set by the plurality of thermo-elements.

Also in a case where the user UA operates the operation input button 22c or 22d of the appliance control device 2, the thermo-element controller 25 switches between the "hot" and "cold" states of the thermo-elements HC11 to HC37 on the basis of the third or fourth thermal pattern information item stored in the storage unit 23 and thereby forms the third thermal pattern PT3 illustrated in FIG. 8 or the fourth thermal pattern PT4 illustrated in FIG. 9.

The thermopile SP1 detects the third thermal pattern PT3 or the fourth thermal pattern PT4 of the appliance control device 2 and transmits the pattern as the thermal image H3 or the thermal image H4 to the lighting controller 10. The lighting controller 10 interprets the third thermal pattern PT3 or the fourth thermal pattern PT4 on the basis of the thermal image H3 or the thermal image H4, and outputs a control signal corresponding to the control mode of the lighting appliance LT1 associated with the third thermal pattern PT3 or the fourth thermal pattern PT4 by using the table TB1.

Accordingly, the lighting appliance LT1 is able to switch the illuminance to illuminance level A or B in accordance with the control signal from the lighting controller 10.

Advantages

As described above, in the control system 1, the thermopile SP1 detects any one of the first thermal pattern PT1 to the fourth thermal pattern PT4 formed by the thermo-elements HC11 to HC37 of the appliance control device 2, and the lighting appliance LT1 is controlled in accordance with the control mode corresponding to any one of the first thermal pattern PT1 to the fourth thermal pattern PT4.

Thus, if the user UA sets any one of the first thermal pattern PT1 to the fourth thermal pattern PT4 by using the thermo-elements HC11 to HC37 of the appliance control device 2 and causes the thermopile SP1 to detect the thermal pattern, the user UA is able to control the lighting appliance LT1 in the control mode in which the intention of the user UA is reflected, without directly operating the lighting appliance LT1.

If a pyroelectric infrared sensor that determines a temperature change as human detection is used, the lighting appliance LT1 will be turned on when the user UA simply passes near the pyroelectric infrared sensor, which may cause wasteful power consumption.

However, since the user UA is able to control the lighting appliance LT1 by using the lighting controller 10 via any one of the first thermal pattern PT1 to the fourth thermal pattern PT4 formed by the appliance control device 2, the user UA is able to reflect his/her intention in the control of the lighting appliance LT1 via any one of the first thermal pattern PT1 to the fourth thermal pattern PT4.

Accordingly, the control system 1 is able to provide a comfortable space desired by the user UA while reducing wasteful power consumption compared to the case of using a pyroelectric infrared sensor according to the related art.

Second Embodiment

Overall Configuration of Control System

Figure 13:
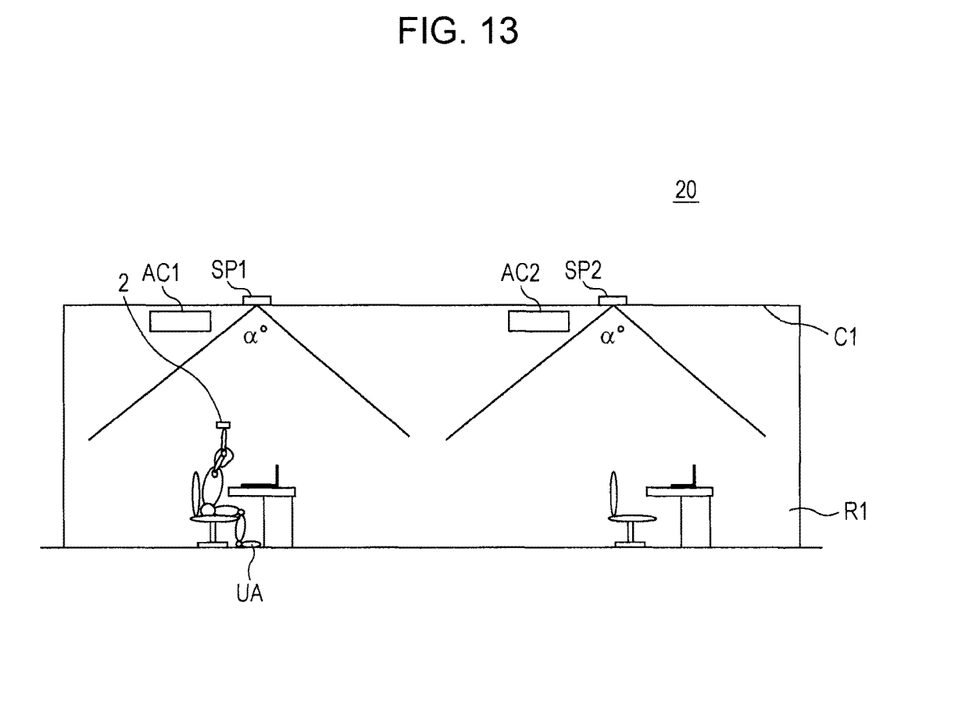
FIG. 13 is a schematic diagram illustrating the overall configuration of an air-conditioning control system according to a second embodiment.
Figure 14:
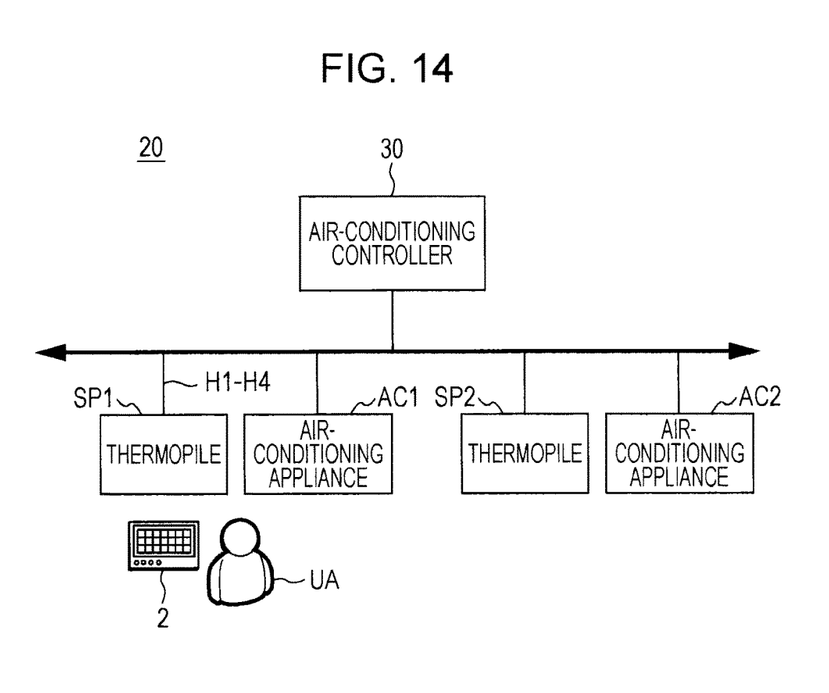
FIG. 14 is a block diagram illustrating the configuration of the air-conditioning control system.

As illustrated in FIGS. 13 and 14, a control system 20 according to the second embodiment includes thermopiles SP1 and SP2 installed on a ceiling C1 of a room R1, air-conditioning appliances AC1 and AC2 installed near the thermopiles SP1 and SP2, an appliance control device 2 used by a user UA to control the air-conditioning appliances AC1 and AC2, and an air-conditioning controller 30 for controlling the air-conditioning appliances AC1 and AC2.

Also in the second embodiment, the thermopiles SP1 and SP2 have the same structure and also the air-conditioning appliances AC1 and AC2 have the same structure. Here, a description will be given of the appliance control device 2, the thermopile SP1, and the air-conditioning appliance AC1. In the second embodiment, the same elements as those of the appliance control device 2 and the thermopile SP1 according to the first embodiment are denoted by the same reference numerals and the detailed description thereof is omitted.

Air-Conditioning Appliance

The air-conditioning appliance AC1 is a central or individual air-conditioning appliance installed on the wall or ceiling of the room R1. The air-conditioning appliance AC1 is able to control air-conditioning in an area of a certain range around the thermopile SP1 and the air-conditioning appliance AC1. On, off, and set temperature or the like of the air-conditioning appliance AC1 are controlled by the air-conditioning controller 30.

Air-Conditioning Controller

Figure 15:
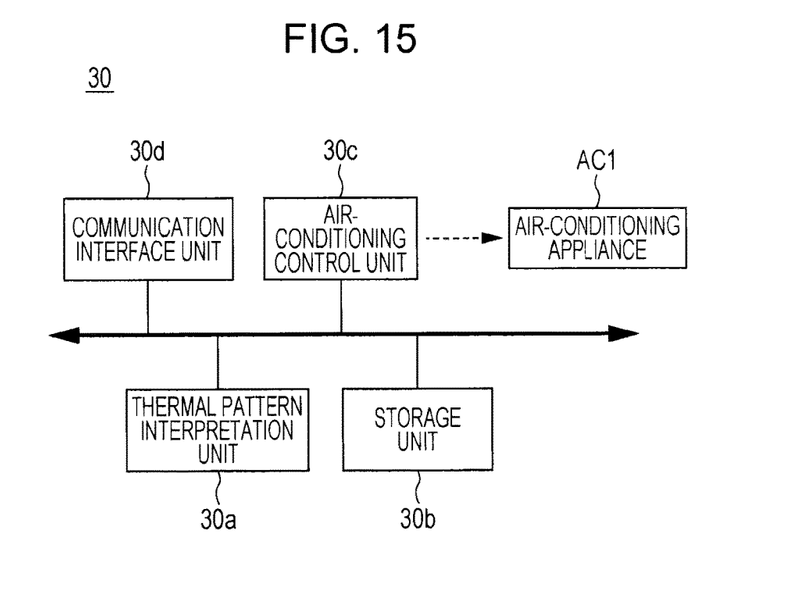
FIG. 15 is a block diagram illustrating the circuit configuration of an air-conditioning controller.

As illustrated in FIG. 15, the air-conditioning controller 30 is a functional unit that interprets any one of the first thermal pattern PT1 to the fourth thermal pattern PT4 on the basis of a corresponding one of the thermal images H1 to H4 of the appliance control device 2 obtained by the thermopile SP1, and that controls the air-conditioning appliances AC1 and AC2 in accordance with a control mode corresponding to any one of the first thermal pattern PT1 to the fourth thermal pattern PT4, and includes a CPU, a memory, and so forth.

The air-conditioning controller 30 includes a thermal pattern interpretation unit 30a, a storage unit 30b, an air-conditioning control unit 30c, and a communication interface unit 30d.

The thermal pattern interpretation unit 30a is a functional unit that has the same configuration as that of the thermal pattern interpretation unit 10a of the lighting controller 10 according to the first embodiment, and that interprets any one of the first thermal pattern PT1 to the fourth thermal pattern PT4 on the basis of the brightness levels of the pixel values of a corresponding one of the thermal images H1 to H4 obtained by the thermopile SP1.

The storage unit 30b is a storage device such as a semiconductor memory or hard disk and stores a table in which the first thermal pattern PT1 to the fourth thermal pattern PT4 are associated with control modes of the air-conditioning appliance AC1.

Figure 16:
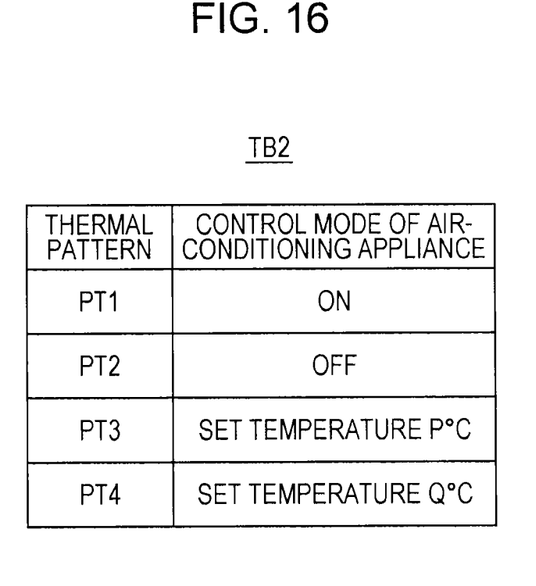
FIG. 16 is a table in which thermal patterns are associated with air-conditioning control modes.

FIG. 16 illustrates an example of a table TB2 in which the first thermal pattern PT1 to the fourth thermal pattern PT4 are associated with the control modes of the air-conditioning appliance AC1. In the table TB2, a control mode for setting the air-conditioning appliance AC1 to an on-state corresponding to the first thermal pattern PT1, a control mode for setting the air-conditioning appliance AC1 to an off-state corresponding to the second thermal pattern PT2, a control mode for setting the air-conditioning appliance AC1 to a set temperature $P°$ C. corresponding to the third thermal pattern PT3, and a control mode for setting the air-conditioning appliance AC1 to a set temperature $Q°$ C. ($P<Q$) corresponding to the fourth thermal pattern PT4 are registered in advance.

The air-conditioning control unit 30c is a functional unit that outputs a control signal for controlling the air-conditioning appliance AC1 in accordance with a control mode of the air-conditioning appliance AC1 associated with any one of the first thermal pattern PT1 to the fourth thermal pattern PT4 received from the thermal pattern interpretation unit 30a. The thermal pattern interpretation unit 30a and the air-conditioning control unit 30c are implemented when the CPU reads and executes programs.

The communication interface unit 30d is a functional unit that connects the air-conditioning controller 30 and the thermopile SP1 when they communicate with each other, and obtains the thermal images H1 to H4 from the thermopile SP1.

In the second embodiment, the thermopile SP1 and the air-conditioning controller 30 in the control system 20 constitute a control apparatus that controls the air-conditioning appliance AC1, and the thermopile SP2 and the air-conditioning controller 30 in the control system 20 constitute a control apparatus that controls the air-conditioning appliance AC2.

Operation of Control System

When the user UA enters the room R1 from the outside and operates the operation input button 22a of the appliance control device 2 while seated at a desk below the thermopile SP1, the appliance control device 2 switches between the "hot" and "cold" states of the thermo-elements HC11 to HC37 on the basis of the first thermal pattern information item and sets the first thermal pattern PT1 (see FIG. 6).

The user UA causes the appliance control device 2 to face the thermopile SP1 so that the thermo-elements HC11 to HC37 of the appliance control device 2 face the thermopile SP1 and that the thermopile SP1 is able to detect the first thermal pattern PT1 formed by the thermo-elements HC11 to HC37 of the appliance control device 2.

The thermopile SP1 obtains the thermal image H1 corresponding to the first thermal pattern PT1 formed by the thermo-elements HC11 to HC37 of the appliance control device 2 and transmits the thermal image H1 to the air-conditioning controller 30.

The thermal pattern interpretation unit 30a of the air-conditioning controller 30 interprets the first thermal pattern PT1 on the basis of the brightness levels of pixel values of the thermal image H1, determines the control mode of the air-conditioning appliance AC1 associated with the first thermal pattern PT1 by using the table TB2, and outputs a control signal corresponding to the control mode to the air-conditioning appliance AC1. Accordingly, the air-conditioning appliance AC1 is switched from an off-state to an on-state and starts an air-conditioning operation in response to the control signal from the air-conditioning controller 30.

After that, when the user UA operates the operation input button 22b of the appliance control device 2, the appliance control device 2 switches between the "hot" and "cold" states of the thermo-elements HC11 to HC37 on the basis of the second thermal pattern information item and forms the second thermal pattern PT2 (see FIG. 7).

The thermopile SP1 obtains the thermal image H2 corresponding to the second thermal pattern PT2 and transmits the thermal image H2 to the air-conditioning controller 30. The air-conditioning controller 30 interprets the second thermal pattern PT2 on the basis of the thermal image H2 and outputs a control signal corresponding to the control mode of the air-conditioning appliance AC1 associated with the second thermal pattern PT2 by using the table TB2. Accordingly, the air-conditioning appliance AC1 is switched from the on-state to the off-state and ends the air-conditioning operation in response to the control signal from the air-conditioning controller 30.

Also in a case where the user UA operates the operation input button 22c or 22d of the appliance control device 2, the appliance control device 2 switches between the "hot" and "cold" states of the thermo-elements HC11 to HC37 on the basis of the third or fourth thermal pattern information item and thereby forms the third thermal pattern PT3 (see FIG. 8) or the fourth thermal pattern PT4 (FIG. 9).

The thermopile SP1 detects the third thermal pattern PT3 or the fourth thermal pattern PT4 of the appliance control device 2 and transmits the pattern as the thermal image H3 or thermal image H4 to the air-conditioning controller 30. The air-conditioning controller 30 interprets the third thermal pattern PT3 or the fourth thermal pattern PT4 on the basis of the thermal image H3 or the thermal image H4, and outputs a control signal corresponding to the control mode of the air-conditioning appliance AC1 associated with the third thermal pattern PT3 or the fourth thermal pattern PT4 by using the table TB2.

Accordingly, the air-conditioning appliance AC1 is able to switch the air-conditioning temperature to the set temperature P° C. or Q° C. in accordance with the control signal from the air-conditioning controller 30.

Advantages

As described above, in the control system 20, the thermopile SP1 detects any one of the first thermal pattern PT1 to the fourth thermal pattern PT4 formed by the thermo-elements HC11 to HC37 of the appliance control device 2, and the air-conditioning appliance AC1 is controlled in accordance with the control mode corresponding to any one of the first thermal pattern PT1 to the fourth thermal pattern PT4.

Thus, if the user UA sets any one of the first thermal pattern PT1 to the fourth thermal pattern PT4 by using the thermo-elements HC11 to HC37 of the appliance control device 2 and causes the thermopile SP1 to detect the thermal pattern, the user UA is able to control the air-conditioning appliance AC1 in the control mode in which the intention of the user UA is reflected, without directly operating the air-conditioning appliance AC1.

Since the user UA is able to control the air-conditioning appliance AC1 by using the air-conditioning controller 30 via any one of the first thermal pattern PT1 to the fourth thermal pattern PT4 formed by the appliance control device 2, the user UA is able to reflect his/her intention in the control of the air-conditioning appliance AC1 via any one of the first thermal pattern PT1 to the fourth thermal pattern PT4.

Accordingly, the control system 20 is able to provide a comfortable space desired by the user UA while reducing wasteful power consumption compared to the case of using a pyroelectric infrared sensor according to the related art.

Other Embodiments

In the above-described first and second embodiments, a description has been given of a case where the temperature of heat generated by each of the plurality of thermo-elements HC11 to HC37 provided in the appliance control device 2 is set to the "hot" state with about 30° C. or the "cold" state with about 10° C. The present disclosure is not limited thereto. As long as the thermopile SP1 is able to detect the temperature of heat generated by each of the thermo-elements HC11 to HC37, the temperature of heat generated by each of the thermo-elements HC11 to HC37 provided in the appliance control device 2 may be set to a "hot" state with about 20° C. or a "cold" state with about 15° C., or a "hot" state or a "cold" state with a certain temperature difference.

In the above-described first and second embodiments, a description has been given of a case where a control apparatus that controls the lighting appliance LT1 or the air-conditioning appliance AC1 is formed of the thermopile SP1 and the lighting controller 10 or the air-conditioning controller 30 in the control system 1 or 20. The present disclosure is not limited thereto. A control apparatus that controls lighting appliances LT1, LT2, . . . , and LTn or air-conditioning appliances AC1, AC2, . . . , and ACn may be formed of a plurality of thermopiles SP1, SP2, . . . , and SPn and the lighting controller 10 or the air-conditioning controller 30.

Furthermore, in the above-described first and second embodiments, a description has been given of a case where the temperature of heat generated by each of the thermo-elements HC11 to HC37 is set to the "hot" state with about 30° C. or the "cold" state with about 10° C. The present disclosure is not limited thereto. The temperature of heat generated by each of the thermo-elements HC11 to HC37 may be set to any one of three thermal stages: a "hot" state with about 30° C., a "medium" state with about 20° C., and a "cold" state with about 10° C. In other words, a plurality of thermal stages may be set in accordance with the temperature detection performance of the thermopile SP1.

Furthermore, in the above-described first and second embodiments, a description has been given of a case where the first thermal pattern PT1 to the fourth thermal pattern PT4 formed by the thermo-elements HC11 to HC37 are stored in the storage unit 23 in advance in association with the operation input buttons 22a to 22d. The present disclosure is not limited thereto. The user UA may be allowed to arbitrarily switch between the "hot" and "cold" states of the thermo-elements HC11 to HC37 so as to form a desired thermal pattern.

Furthermore, in the above-described first and second embodiments, a description has been given of a case where the thermopiles SP1 and SP2 formed of an infrared detection sensor array are used as an obtaining unit. However, the present disclosure is not limited thereto. An infrared camera, a thermal image camera, or the like may be used as an obtaining unit.

Furthermore, in the above-described first and second embodiments, a description has been given of a case where the lighting appliance LT1 and the air-conditioning appliance AC1 are used as a target to be controlled. The present disclosure is not limited thereto. An electronic appliance such as a personal computer or another appliance may be used as a target to be controlled.

For example, a control mode for switching between on and off states of the lighting appliance LT1 may be resisted for the first thermal pattern PT1 assigned to the operation input button 22a, a control mode for switching between on and off states of the air-conditioning appliance AC1 may be resisted for the second thermal pattern PT2 assigned to the operation input button 22b, and a control mode for switching between on and off states of a personal computer may be resisted for the third thermal pattern PT3 assigned to the operation input button 22c, in a table and the table may be stored in a storage unit in advance. Accordingly, after the user UA enters the room R1, the user UA is able to perform a series of operations in a noncontact manner by using the appliance control device 2: turn on the lighting appliance LT1, start an air-conditioning operation of the air-conditioning appliance AC1, and start the personal computer, via the operation input buttons 22a to 22c of the appliance control device 2.

What is claimed is:

1. A control apparatus, comprising:
   a sensor configured to detect a thermal pattern formed by a plurality of thermo-elements arranged in an appliance control device, a temperature of heat generated by each of the plurality of thermo-elements in the appliance control device being controllable; and
   a control circuit configured to control an appliance in accordance with the thermal pattern detected by the sensor.

2. The control apparatus according to claim 1, wherein the plurality of thermo-elements are Peltier elements.

3. The control apparatus according to claim 1, wherein the sensor is a thermopile configured to detect the thermal pattern formed by the plurality of thermo-elements as a thermal image.

4. The control apparatus according to claim 1, wherein the appliance is a lighting appliance, and
   the control circuit is further configured to control on, off, and dimming of the lighting appliance.

5. The control apparatus according to claim 1, wherein the appliance is an air-conditioning appliance, and
   the control circuit is further configured to control on, off, and a set temperature of the air-conditioning appliance.

6. The control apparatus of claim 1, wherein the control circuit is further configured to control the appliance in accordance with a control table stored in a memory, the control table storing thermal patterns in association with corresponding control modes of the appliance.

7. A control system, comprising:
   an appliance control device including a plurality of thermo-elements arranged therein, a temperature of heat generated by each of the plurality of thermo-elements being controllable;
   a sensor configured to detect a thermal pattern formed by the plurality of thermo-elements arranged in the appliance control device; and
   a control circuit configured to control an appliance in accordance with the thermal pattern detected by the sensor.

8. The control system according to claim 7, wherein the plurality of thermo-elements are Peltier elements.

9. The control system according to claim 7, wherein the sensor is a thermopile configured to detect the thermal pattern formed by the plurality of thermo-elements as a thermal image.

10. The control system according to claim 7, wherein
    the appliance is a lighting appliance, and
    the control circuit is further configured to control on, off, and dimming of the lighting appliance.

11. The control system according to claim 7, wherein
    the appliance is an air-conditioning appliance, and
    the control circuit is further configured to control on, off, and a set temperature of the air-conditioning appliance.

12. The control system of claim 7, wherein the control circuit is further configured to control the appliance in accordance with a control table stored in a memory, the control table storing thermal patterns in association with corresponding control modes of the appliance.

13. The control system of claim 7, wherein the temperature of heat generated by each of the plurality of thermo-elements is controllable by input from a user.

14. An appliance control device, comprising:
    a plurality of thermo-elements that form a plurality of thermal patterns; and
    a thermo-element control circuit configured to set the plurality of thermal patterns by controlling a temperature of heat generated by each of the plurality of thermo-elements.

15. The appliance control device of claim 14, further comprising an interface configured to receive an input from the user, the input being used to control the temperature of heat generated by each of the plurality of thermo-elements.

16. The appliance control device of claim 14, wherein the appliance control device is a handheld device.

* * * * *